US008712154B2

(12) United States Patent
Perbet et al.

(10) Patent No.: US 8,712,154 B2
(45) Date of Patent: Apr. 29, 2014

(54) IMAGE PROCESSING SYSTEM AND METHOD

(75) Inventors: Frank Perbet, Cambridge (GB); Atsuto Maki, Cambridge (GB); Minh-Tri Pham, Cambridge (GB); Bjorn Stenger, Cambridge (GB); Oliver Woodford, Cambridge (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 130 days.

(21) Appl. No.: 13/408,541

(22) Filed: Feb. 29, 2012

(65) Prior Publication Data

US 2012/0251003 A1 Oct. 4, 2012

(30) Foreign Application Priority Data

Mar. 23, 2011 (GB) .................................. 1104909.5

(51) Int. Cl.
*G06K 9/34* (2006.01)
(52) U.S. Cl.
USPC ............................. 382/173; 382/180; 382/199
(58) Field of Classification Search
USPC .......................................... 382/173, 180, 199
See application file for complete search history.

(56) References Cited

U.S. PATENT DOCUMENTS

| 6,912,004 | B1 * | 6/2005 | Knudsen et al. ............... 348/273 |
| 7,995,841 | B2 * | 8/2011 | Lin et al. ........................ 382/173 |
| 8,185,275 | B2 * | 5/2012 | Han et al. ......................... 701/50 |
| 8,199,223 | B2 * | 6/2012 | Sasaki ............................. 348/241 |
| 8,224,093 | B2 * | 7/2012 | Grady et al. ................... 382/180 |
| 8,428,363 | B2 * | 4/2013 | Tuzel et al. .................... 382/199 |
| 2009/0080774 | A1 | 3/2009 | Lin et al. |
| 2009/0128854 | A1 * | 5/2009 | Takei ............................ 358/1.15 |
| 2010/0061652 | A1 * | 3/2010 | Takeshima et al. ........... 382/268 |
| 2010/0189351 | A1 * | 7/2010 | Mattausch et al. ............ 382/173 |
| 2012/0041722 | A1 * | 2/2012 | Quan et al. ........................ 703/1 |
| 2012/0092357 | A1 * | 4/2012 | Wang et al. .................... 345/581 |
| 2012/0114240 | A1 * | 5/2012 | Yamada ......................... 382/173 |
| 2012/0251003 | A1 * | 10/2012 | Perbet et al. .................... 382/173 |

OTHER PUBLICATIONS

United Kingdom Combined Search and Examination Report issued Jul. 11, 2011, in Patent Application No. GB1104909.5.

(Continued)

*Primary Examiner* — Gregory M Desire
(74) *Attorney, Agent, or Firm* — Oblon, Spivak, McClelland, Maier & Neustadt, L.L.P.

(57) ABSTRACT

A method dividing an image into plural superpixels of plural pixels of the image. The method calculates an initial set of weights from a measure of similarity between pairs of pixels, from which a resultant set of weights is calculated for pairs of pixels that are less that a threshold distance apart on the image. The calculation calculates a weight for a pair of pixels as the sum over a set of third pixels of the product of initial weight of the first pixel of the pair of pixel with the third pixel and the weight of the third pixel with the second pixel. Each weight is then subjected to a power coefficient operation. The resultant set of weights and the initial set of weights are then compared to check for convergence. If the weights converge, the converged set of weights is used to divide the image into superpixels.

20 Claims, 11 Drawing Sheets
(5 of 11 Drawing Sheet(s) Filed in Color)

(56) References Cited

OTHER PUBLICATIONS

Rachid Hedjam, et al, "A hierarchical graph-based markovian clustering approach for the unsupervised segmentation of textured color images", Proceedings of the 16$^{th}$ IEEE international conference on Image Processing (ICIP'09), Nov. 7-10, 2009, pp. 1365-1368 http://www.iro.umontreal.ca/~mignotte/Publications/icip10_hedjam.pdf.

XiaoFeng Wang, et al., "A New Localized Superpixel markov Random Field for Image Segmentation", Proceedings of the 2009 IEEE international conference on Multimedia and Expo (ICME 2009), Jun. 28-Jul. 3, 2009, pp. 642-645 http://www.ee.ryerson.ca/~xzhang/publications/icme2009-wang-zhang.pdf.

Xiaofeng Ren, et al., "Learning a Classification Model for Segmentation", Proceedings of the Ninth IEEE International Conference on Computer Vision (ICCV'03), Computer Society, 2003, pp. 1-8.

Stijn Marinus Van Dongen, "Graph Clustering by Flow Simulation", PhD thesis, University of Utrecht, 2000, pp. 1-169, with cover pages.

Ce Liu, et al., "Noise Estimation from a Single Image", IEEE Conference on Computer Vision and Pattern Recognition, CVPR2006, 2006, 8 pgs.

Greg Mori, et al., "Recovering Human Body Configurations: Combining Segmentation and Recognition", CVPR2004, 2004, pp. 1-8.

Branislav Mičušik, et al., "Piecewise Planar City 3D Modeling from Street View Panoramic Sequences", CVPR2009, 2009, pp. 1-7.

C. Tomasi, et al., "Bilateral Filtering for Gray and Color Images", Proceedings of the 1998 IEEE International Conference on Computer Vision, 8 pgs.

\* cited by examiner (a)

(b)

IMAGE PROCESSING SYSTEM AND METHOD

Embodiments described herein relate generally to methods and systems for segmenting an image.

Many image processing techniques involve a pre-processing step of segmenting an image. Segmenting an image involves dividing a digital image into superpixels. Each superpixel is a set of pixels of the image. Following segmentation, the processing of the image is carried out on the superpixels. The segmentation of an image into superpixels allows an input image to be encoded in a compact manner that reflects the structural information in an image. This facilitates processing of the image in order to, for example, classify features in the image.

In order to facilitate efficient further processing of an image following segmentation, it is often advantageous to generate superpixels that are homogeneous, that is, superpixels that are uniform in size and compact in shape. This requirement often has to be balanced with the computational cost of segmenting an image into superpixels.

BRIEF DESCRIPTION OF THE DRAWINGS

The patent or application file contains at least one drawing executed in color. Copies of the patent or patent application publication with color drawing(s) will be provide by the office upon request and payment of the necessary fee.

In the following, embodiments of the invention will be described with reference to the drawings in which.

DETAILED DESCRIPTION

Figure 1:
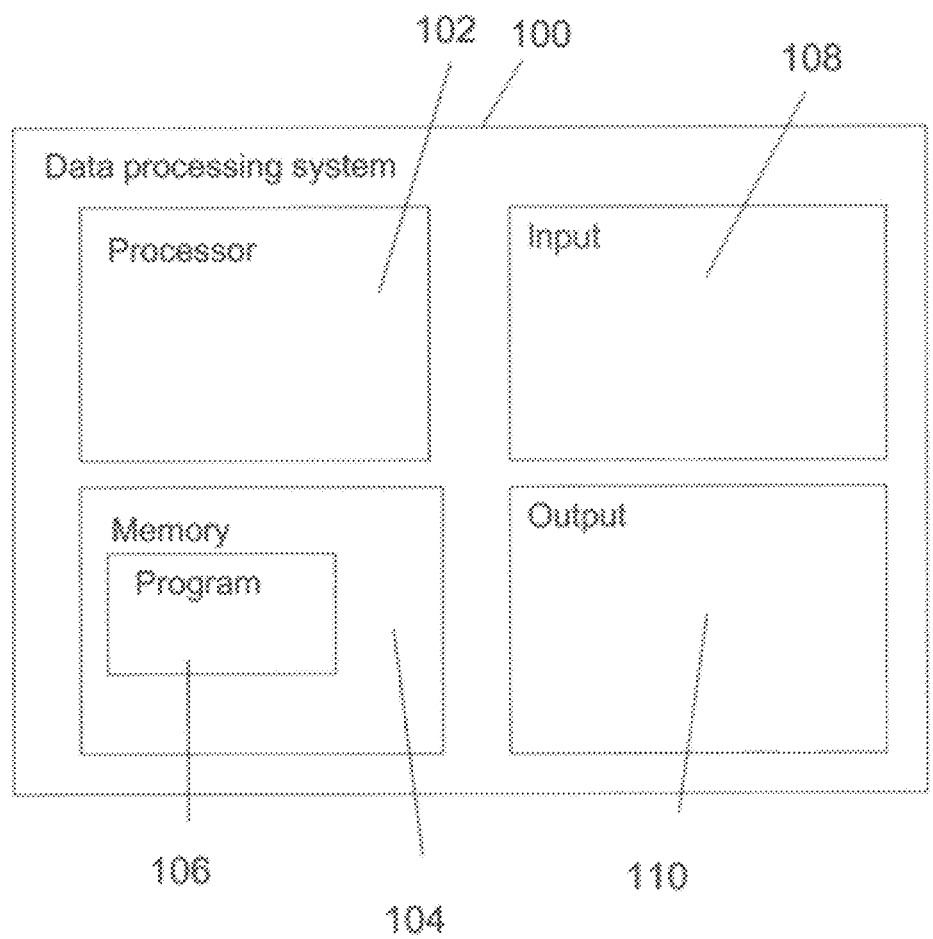
FIG. 1 is a block diagram of a data processing system for dividing an image into superpixels.

Embodiments described herein are directed to dividing an image into superpixels and processing the image using the superpixels. In one embodiment, a method for dividing an image into a plurality of superpixels is disclosed. Each superpixel comprises a plurality of pixels of the image. The method includes calculating weights between pairs of pixels of the image. The weights calculated are used later in the method to divide the image into superpixels. The weights are iteratively recalculated from an initial set of weights that are calculated from a measure of similarity between pairs of pixels. From the initial set of weights, a resultant set of weights is calculated for pairs of pixels that are less than a threshold distance apart on the image. The calculation of the resultant set of weights comprises calculating a weight for a pair of pixels as the sum over a set of third pixels of the product of initial weight of the first pixel of the pair of pixel with the third pixel and the weight of the third pixel with the second pixel. Each weight is then subjected to a power coefficient operation. Following the calculation of the resultant set of weights, the resultant set of weights and the initial set of weights are compared to check for convergence. If the weights converge, then the converged set of weights is used to divide the image into superpixels.

Embodiments of the present invention facilitate the division of an image into superpixels in a computationally efficiently manner. Because the resultant weights are only calculated for pair of pixels within the threshold distance of each other on the image, the method can be used for large images without a large increase in complexity. Further, the superpixels that result from the method are homogenous in size and shape. This allows accurate processing of images in processing steps that use the superpixel representation generated by the method.

In an embodiment, calculating a weight for a first pixel and a second pixel comprises reading a first look up table. The first look up table indicates a set of transformations on the image between the first pixel the set of pixels that are within the threshold distance of the first pixel. Because of the regular nature of the image, the transformations between pairs pixels on the image that are within the threshold distance of each other can be calculated before execution of the algorithm and stored in look up table.

In an embodiment, calculating a weight for a first pixel and a second pixel further comprises reading a second look up table. The second look up table indicates the set of transformations on the image from the first pixel to the second pixel via the set of third pixels.

In an embodiment, the measure of similarity between pixels is calculated from a difference in intensity between pixels.

In an embodiment, memory is allocated for storing a set of weights associated with each pixel of the image. The memory is allocated according to the number of pixels that are within the threshold distance of a given pixel. Because weights are calculated between pairs of pixels that are separated by less that the threshold distance the number of weights associated with a given pixel is known before the weights are calculated. This means that memory can be allocated for storing the weights before starting the method.

In an embodiment, the initial weights are stored in the memory as the set of weights associated with each pixel. The initial set of weights are replaced with the resultant set of weights after the calculation of the resultant set of weights.

In one embodiment, a method of processing an image comprises dividing the image into superpixels and processing the image using the superpixels.

In an embodiment, processing the image comprises recognising a feature in the image.

In an embodiment, processing the image comprises encoding the image.

In an embodiment, processing the image comprises calculating a three dimensional reconstruction of the image.

In an embodiment, processing the image using the superpixels comprises reducing noise in the image.

In an embodiment, there is provided a computer readable medium carrying computer executable instructions which when executed on a computer cause the computer to execute a method of dividing an image into superpixels.

In an embodiment an image processing system for dividing image into a plurality of superpixels is disclosed. Each superpixel comprising a plurality of pixels of the image. The system comprises a processor. The processor is operable to calculate an initial set of weights. Each weight is associated with a pair of pixels of the image. The initial set of weights is calculated using a measure of similarity between neighbouring pixels. The processor calculates a resultant set of weights from the initial set of weights. The resultant set of weights is calculated for pairs of pixels in the image separated by less than a threshold distance. The resultant set of weights is calculated by calculating a weight for a first pixel and a second pixel as the sum over third pixels of the product of the initial weight between the first pixel and a third pixel with the initial weight between that third pixel and the second pixel and calculating a value of each weight to a power coefficient and then normalising the set of weights to the power coefficient such that the set of all weights of a pixel sum to one. The processor then compares the initial set of weights and the resultant set of weights to check for convergence to a converged set of weights. The pixels are grouped into superpixels using the converged set of weights.

In an embodiment the system further comprises storage for a first look up table. The first look up table indicates a set of transformations on the image from the first pixel to the set of pixels that are within the threshold distance of the first pixel. The processor is operable to calculate a weight for a first pixel and a second pixel by reading the first look up table.

In an embodiment the system further comprises storage for a second look up table. The second look up table indicates the set of transformations on the image from the first pixel to the second pixel via the set of third pixels. The processor is operable to calculate a weight for a first pixel and a second pixel by reading the second look up table.

In an embodiment the system further comprises a memory. The memory is allocated for storing a set of weights associated with each pixel of the image. The memory is allocated according to the number of pixels with the threshold distance of a given pixel.

In an embodiment the processor is further operable to store the initial set of weights in the memory as the set of weights associated with each pixel and replace the initial set of weights with the resultant set of weights following calculation of the resultant set of weights.

In an embodiment, the system is operable to further process the image using the superpixels.

In an embodiment, the processor is further operable to reduce noise in the image using the superpixels.

In an embodiment, the processor is operable to recognise a feature in the image using the superpixels.

In an embodiment, the processor is operable to encode the image using the superpixels.

In an embodiment, the processor is operable to calculate a three dimensional representation of the image using the superpixels.

FIG. 1 shows a data processing system 100 for dividing an image into superpixels. The data processing system 100 comprises a processor 102, a memory 104, an input module 108, and an output module 110. The memory 104 stores a program 106 for dividing an image into superpixels. The program 106 can be executed on the processor 102. The input module 108 can receive input of an image for processing and the output module 110 can output the results of the processing. The data processing system 100 may execute further processing of the image. This further processing can be based upon the superpixels. Alternatively, the output module 110 may output the superpixels. The input module 108 may be a data connection capable of receiving image data from a camera or video camera. The input module 108 may be a network connection capable of receiving image data over a network such as the internet. The data processing system 100 may be a conventional computer. The methods followed by the program 106 are described below.

Figure 2:
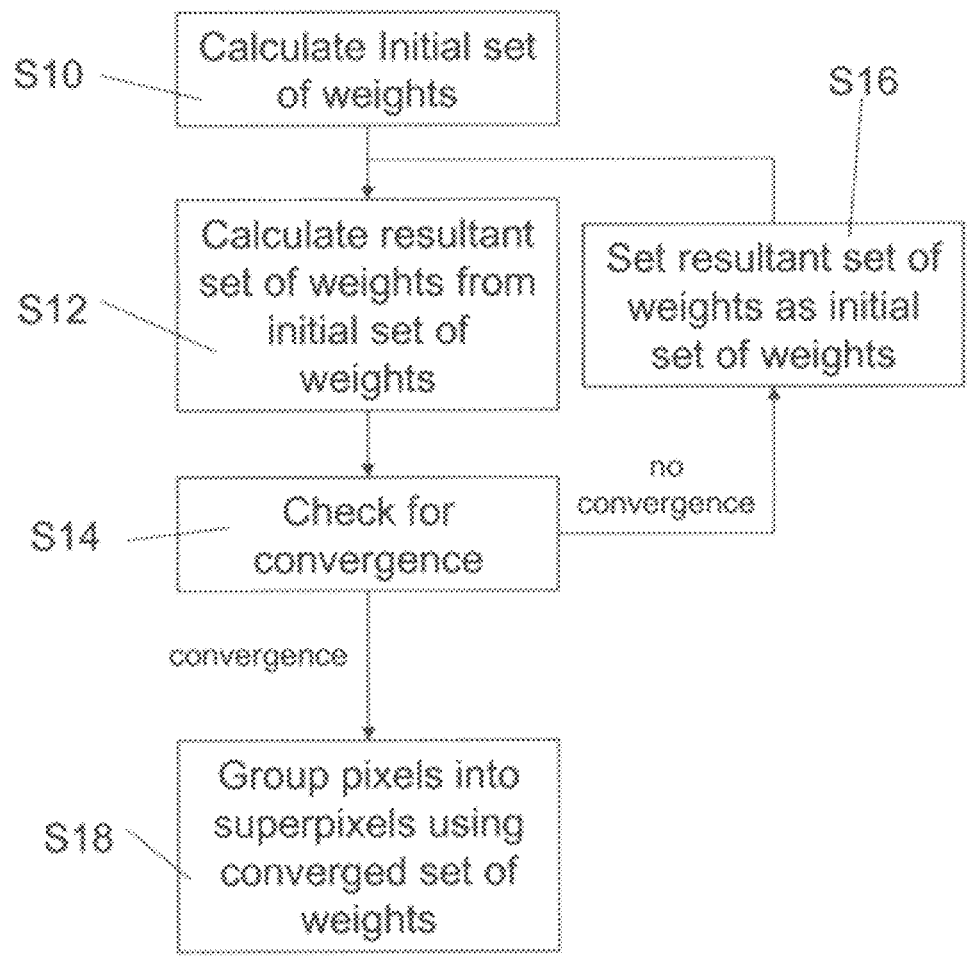
FIG. 2 is a flow diagram of a method for dividing an image into superpixels.

FIG. 2 shows a flowchart of a method of dividing an image into superpixels in accordance with an embodiment of the present invention. The method involves iteratively calculating weights between pixels of the image. When this set of weights is observed to converge, the image is divided into superpixels using the converged set of weights. In step S10 an initial set of weights between pixels of the image are calculated. The initial set of weights is calculated from a measure of similarity between neighbouring pixels. This measure of similarity may be for example based upon the difference of intensity of pairs of pixels. In step S12, a resultant set of weights is calculated using the initial set of weights. The resultant set of weights may be calculated for more pairs of pixels in the image than the initial set of weights. The calculation of the resultant set of weights is limited to pairs of pixels within a threshold distance of one another. A check for convergence is carried out in step S14. This involves comparing the initial set of weights and the resultant set of weights. If the resultant set of weights and the initial set of weights are found not to converge, the resultant set of weights is stored as the initial set of weights in step S16. Following S16, a further resultant set of weights is calculated from the new initial set of weights. If in step S14 the weights are found to converge, the image is divided into superpixels in step S18. Dividing the image into superpixels comprises grouping pixels that have non-zero weights together into superpixels.

The method described above is based on the Markov Clustering (MCL) algorithm. The MCL algorithm involves repeatedly applying two operators to a stochastic graph. The result of applying the MCL algorithm is that the stochastic graph is divided into a set of clusters. The application of the two operators to the stochastic graph can be considered as making a random walk in the graph with the probability that a node of the graph will be visited in the random walk determining whether that node will form part of the same cluster as other nodes in that random walk. When applying the MCL algorithm to the problem of dividing an image into superpixels, the image is considered to be a graph. Each pixel on the graph corresponds to a node on the graph. Edges on the graph link nodes corresponding to pixels. The result of applying the MCL algorithm to a graph is set of disjoint trees. When the graph represents an image, these disjoint trees are groups of pixels of the image. Embodiments of the present invention include modifications to the MCL algorithm that reduce the computational cost of applying the MCL algorithm and influence the form of the superpixels that are generated.

As mentioned above, the MCL algorithm involves repeatedly applying two operators to a stochastic graph. These are the expansion operator and the inflation operator. The expansion operator acts to circulate flow within the graph and tends to mix areas of similar appearance. The inflation operator makes strong edges stronger and weak edges weaker. This serves the dual purpose of creating cluster boundaries and electing a representative of each cluster at the same time. The expansion and inflation operators are repeatedly applied until convergence. Convergence is considered to occur when the graph is stable under the expansion and inflation operators. At convergence, the graph becomes a disjoint set of trees.

The MCL algorithm may be described mathematically as follows. An undirected graph, $G=(V, E)$ is defined with nodes $v \in V$ and edges $e \in E$. An edge e spanning two nodes $v_\alpha$ and $v_\beta$ is denoted as $e_\alpha^\beta$ and a weight for this edge is defined as $w(e_\alpha^\beta)$ and denoted as $w_\alpha^\beta$. The graph G is transformed to a Markov graph. A Markov graph is a graph where for all nodes the weights of out edges are positive and sum to one.

For the Markov graph, a stochastic matrix known as the Markov matrix may be written as follows, such that each entry is the edge weight:

$$M = (w_\alpha^\beta, \alpha, \beta \in [1, N])$$

Where N is the total number of nodes.

In the above formalism, the expansion operator is to compute the square of M. The inflation operator is to take the Hadamard power of a matrix M followed by a scaling step, such that the resulting matrix is stochastic again. The Hadamard power of a matrix is calculated by taking powers element-wise.

Thus, for a non-negative stochastic matrix, M, of a Markov graph, G=(V, E), the steps of the MCL algorithm can be formulated as:

$$M_2 = M^2 \text{ expansion}$$

$$M_1 = \mathcal{H}_p(M_2) \text{ inflation}$$

$$M_{new} = \mathcal{N}(M_1)$$

where Hp(•) and N(•) represent element-wise power operation with a power coefficient, p, and column-wise normalisation, respectively. The steps are repeated while updating M with $M_{new}$. The process stops when it reaches equilibrium where no difference is observed between M and $M_{new}$. At this stage, the resulting graph, described by the resultant stochastic matrix, appears as a set of disjoint trees whose union covers the whole graph. Each tree defines a cluster which can be uniquely represented by the tree root. Thus, for a given node, the identity of the cluster to which it belongs can be retrieved by tracing the tree up to its root. An important parameter governing the behaviour of the MCL process is the inflation parameter, p. This influences the resolution of the output. A high inflation value produces a higher number of smaller clusters. It is noted that the number of clusters generated by MCL is emergent. That is, it is not set directly. The convergence time of MCL greatly depends on the target resolution of clustering. The coarser the expected clusters are, the longer it takes. Moreover, the convergence of MCL is known to be more stable for fine resolution. Thus, MCL is considered well suited to the computation of superpixels for which a fine resolution is typically required.

The MCL algorithm may be used to divide an image into superpixels as follows. An input image I, which is $n_x$ by $n_y$ pixels is interpreted as a graph G=(V, E). Each pixel of the image I corresponds to a node in the following set:

$$V = \{v_{f(i,j)} | f(i,j) \in [1, n_x] \times [1, n_y]\}$$

Where $f(i, j) = j \cdot n_x + i$ is the flat index function which returns a one dimensional index to the node (i, j). The number of nodes, N is the total number of pixels $N = n_x n_y$. The set of edges $E = \{e_\alpha^\beta\}$ connect neighbouring nodes for example:

$$v_\alpha = f(i,j) \text{ and } v_\beta = f(m,n).$$

The image structure is mapped onto the graph by defining a function that maps a difference in image intensities to edge weights. The adjacency matrix for a graph corresponding to an image can be initialised using an 8-neighbourhood similarity function:

$$w_\alpha^\beta = \exp(-\mu \|I[m,n] - I[i,j]\|^2)$$

Where I[i, j]=(r, g, b) denotes the intensity of the image over available channels. The parameter μ can be chosen as a free parameter. μ=10 was used for the results presented here.

In an embodiment of the present invention, the MCL process described above is modified to limit the length to which edges can be extended to in the expansion step. This modification has been observed to give two advantages. Firstly, the shape of the resulting superpixels from the modified method is homogenous. Secondly, by limiting the length of edges, the computational cost of segmenting an image is reduced in comparison to the MCL process with no limit on edge lengths.

The modified MCL scheme applies an upper bound on the length of new edges created in the expansion step. This involves enforcing the following condition in the expansion step:

$$\|(m,n) - (i,j)\| > r \Rightarrow w_{f(i,j)}^{f(m,n)} = 0$$

Where r is a distance threshold in pixels.

It is noted that there is a formal proof that the MCL process will converge. When the condition above is included in the expansion step, the process becomes an approximation. However, the modified MCL process has been observed to converge for all images that it has been applied to.

Figure 3:
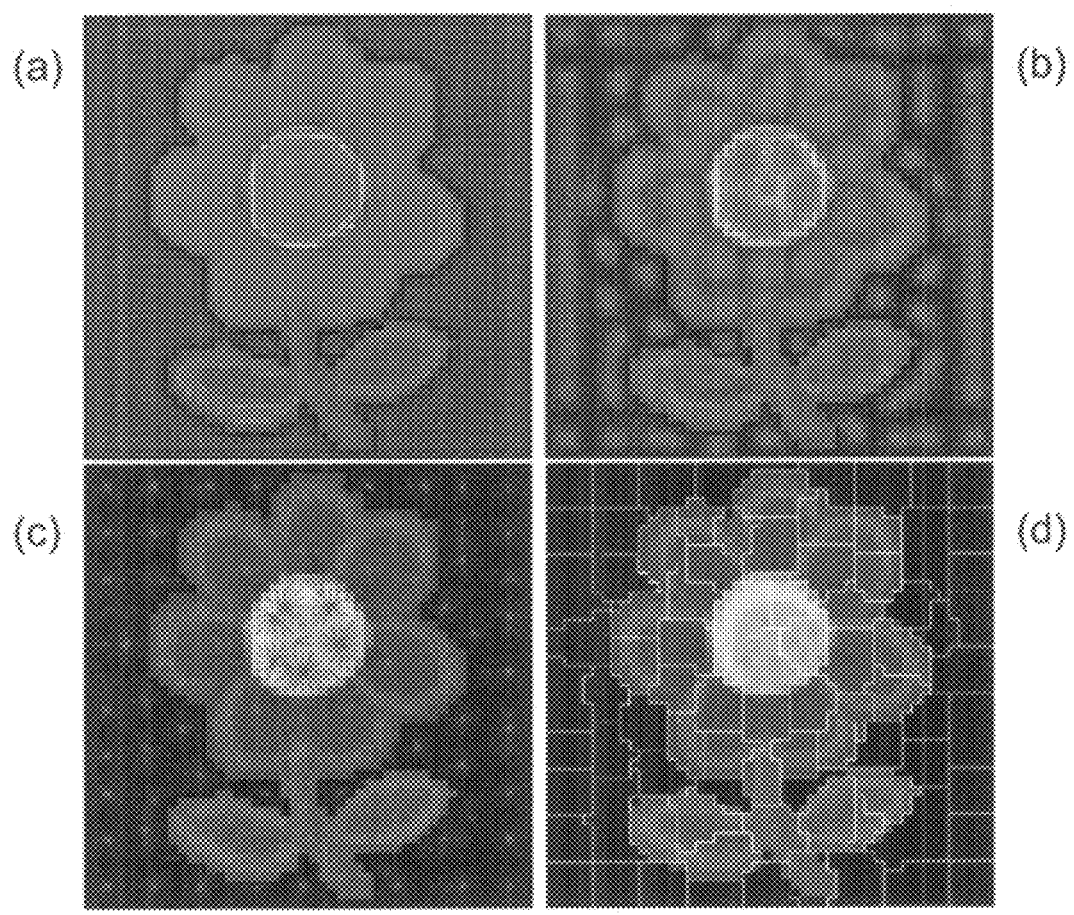
FIG. 3 shows a method of dividing an image into superpixels.

FIG. 3 illustrates the steps involved in dividing an image into superpixels according to an embodiment of the present invention. In FIG. 3a, weights between pixels are initialised using a similarity measure. Links or edges between pixels with non-zero weights are shown. FIG. 3b shows the weights between pixels after applying the expansion and inflation operators a number of times. Here the expansion operator is applied subject to the constraint that there is an upper bound on the distance for which weights are calculated for pairs of pixels. FIG. 3c shows the non-zero weights after iteratively applying the expansion and inflation operators until convergence is reached. FIG. 3d shows the image divided into superpixels according to the weights illustrated in FIG. 3c.

Figure 4:
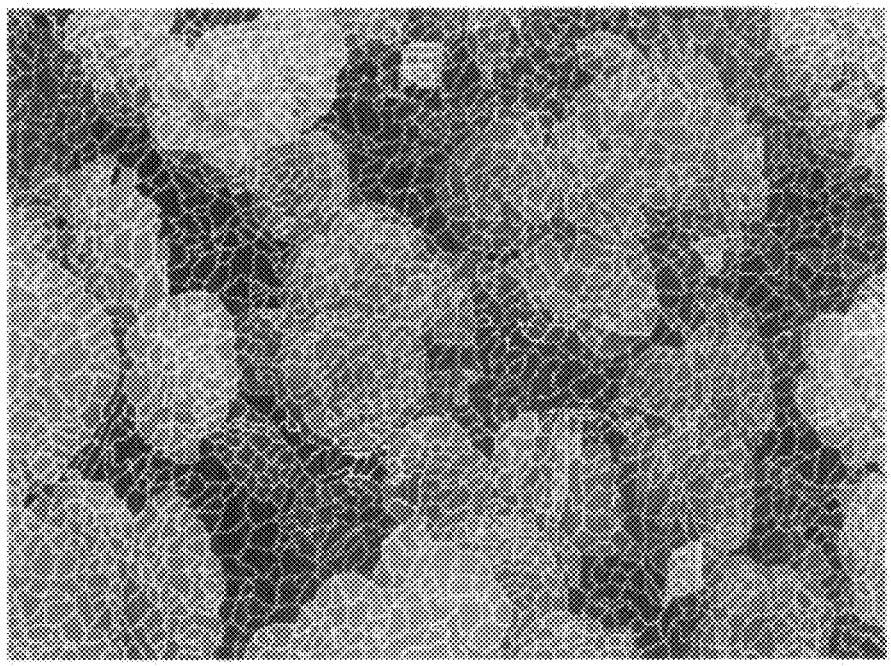
FIG. 4 is an image divided into superpixels.
Figure 4:
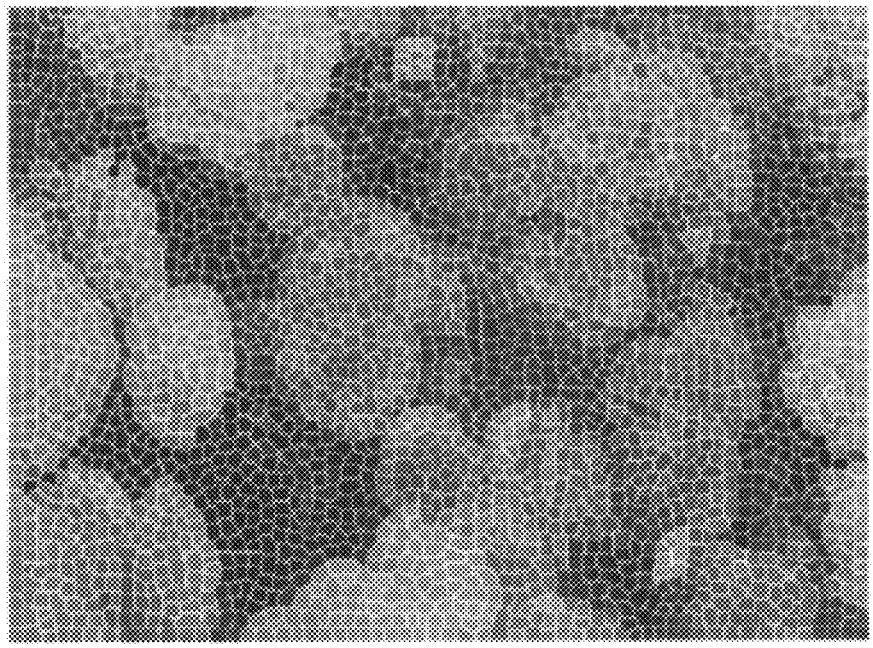

FIG. 4 shows a comparison between the superpixels generated by the original MCL method (FIG. 4a) and by the MCL method including a distance threshold (FIG. 4b). The superpixels shown in FIG. 4b are clearly more uniform in size and shape.

The computational cost of applying the MCL method constraint on the maximum length of edges discussed above reduces the number of non-zero elements in the matrix M and thus reduces the computational cost of calculating $M^2$ in the expansion step. Further, because the maximum number of edges coupled to a node is limited by the distance constraint, and thus number is known before the calculation starts, the encoding for the matrix M can be implemented as follows. The matrix M is stored by retaining the 2D structure of the image and associating the weights for each edge departing from a node with the pixel corresponding to that node. Since the maximum number of non-zero weights associated with a node corresponding to a pixel are known before the calculation is started, the volume can be allocated when the calculation is initialised and this allocation can be maintained throughout the calculation.

The edge weights are stored in a volume L. The volume L has a size $n_x \times n_y \times N_e$, where $n_x \times n_y$ is the size in pixels of the input image and $N_e$ is the number of edges with non-zero weights departing from each node. $N_e$ can also be considered as the number of weights associated with each pixel of the image.

For a pixel at location (i, j) on the image, the edge entry L[i, j; e] starts at the node $v_{i,j}$ to point at a node at (i, j)+offset[e]. offset[e] is a table representing all possible jumps that can be made from a given node. offset[e] can be pre-computed based on the maximum length for edges, r. For example, when r=1, the table offset is given by [(0,0), (−1,0), (+1,0), (0,−1), (0,+1)]. The table is pre-computed and may be shared for all nodes in the graph.

Figure 5:
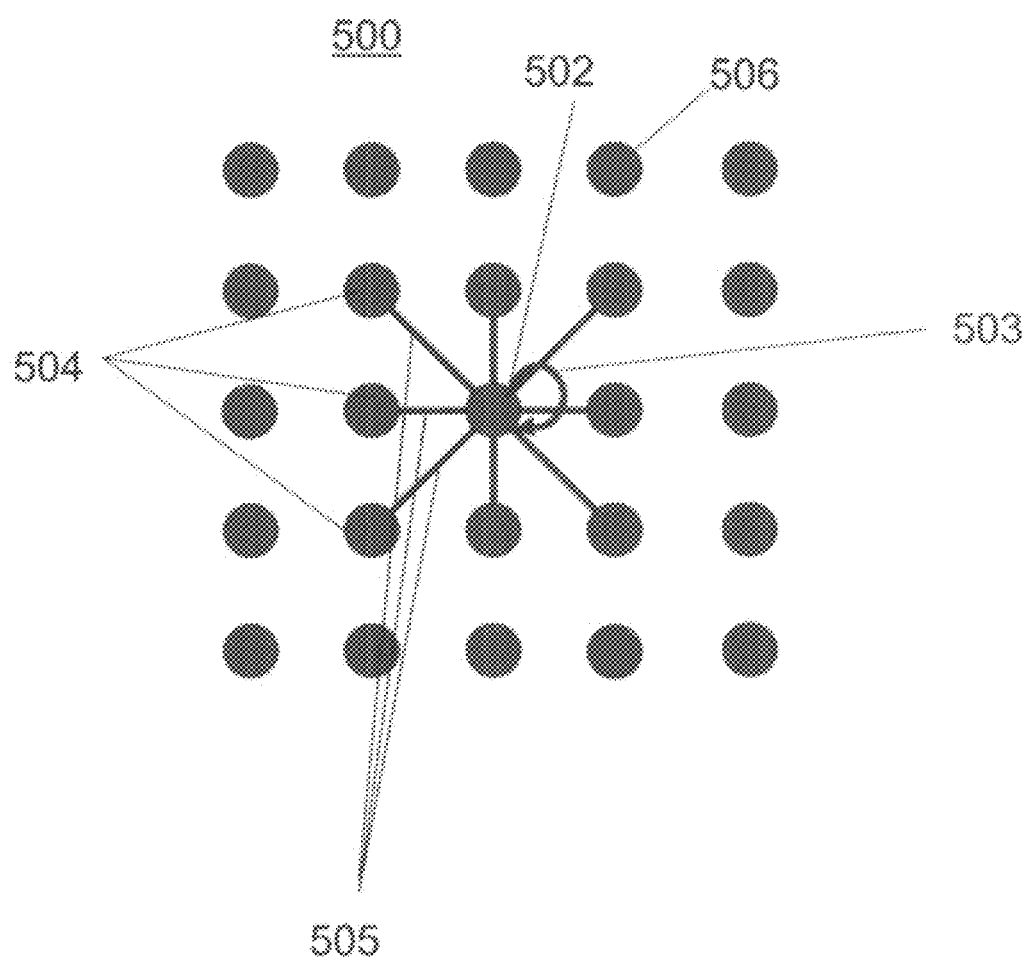
FIG. 5 is a schematic diagram of a section of an image

FIG. 5 is a schematic diagram of a section of an image illustrating the non-zero weights associated with a pixel of an image. The image 500 comprises a plurality of pixels 502, 504, 506. A pixel of the image 502 has non-zero weights with pixels 504 that are within distance r. In the example shown in FIG. 5, r=√2. There are non-zero weights associated with the edge 503 between the pixel 502 and itself and also the edges 505 between the pixel 502 and the pixels 504 in the image that are less than r=√2 from the pixel 502.

In the case shown in FIG. 5, offset=[(0; 0); (1; 0); (1; 1); (0; 1); (−1; 1); (−1; 0); (−1;−1); (0;−1); (1;−1)]. This table is shared by all nodes because of the regular nature of the image graph.

The matrix encoding discussed above facilitates the calculation of $M^2$ in the calculation of the expansion operation of the modified MCL process. Each element of $M_2=M^2$ is given by the following:

$$w'^\beta_\alpha = \sum_{\gamma=1}^{N} w^\gamma_\alpha w^\beta_\gamma$$

From a graph point of view, this equation may be considered as replacing the weight $w_\alpha^\beta$ on path with the sum of the products of all weights on the 2-paths linking node $v_\alpha$ with node $v_\beta$ via a third node $v_\gamma$. The encoding described above allows the edges departing from a given node to be efficiently determined.

The set of 2-paths linking two nodes are pre-computed and stored in a look-up table, This is possible because of the regular nature of the graph associated with the image.

Figure 6:
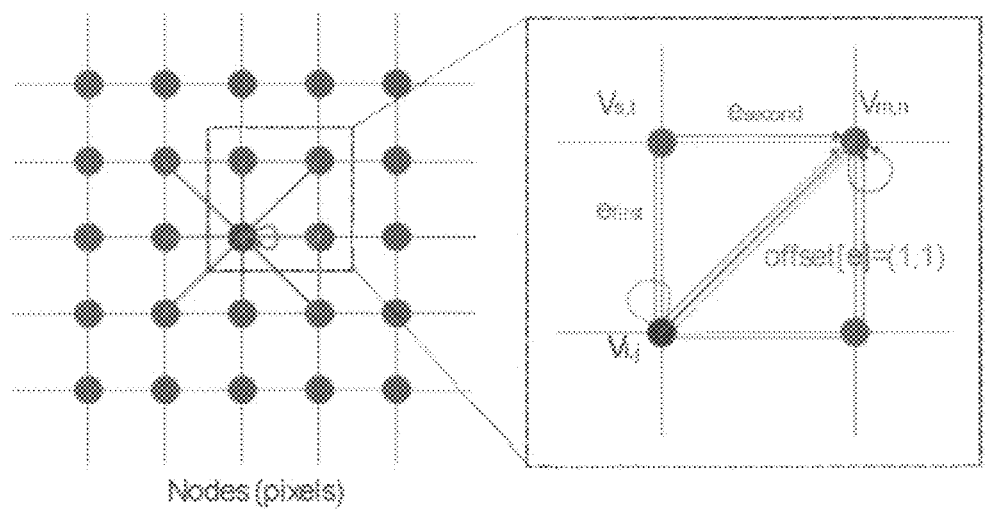
FIG. 6 is a schematic diagram of a section of an image showing the paths used to calculate weights between pairs of pixels.

FIG. 6 shows the set of 2-paths used to calculate the weight for the edge between the node $v_{i,j}$ and the node $v_{m,n}$. This edge corresponds to offset[e]=(1,1) because the node $v_{m,n}$ is one pixel above and one pixel to the right of $v_{i,j}$ in the image.

When calculating $M^2$, the weights on edges given by e∈[0, $N_e$] are updated for each node. The e-th edge starts at $v_{i,j}$ and ends at node $v_{m,n}$ where (m,n)=(i, j)+offset[e]. A general 2-path connecting (i,j)→(s,t)→(m,n) can be defined as [$e_{first}$, $e_{second}$] where:

(s,t)=(i,j)+offset[$e_{first}$]

(m,n)=(s,t)+offset[$e_{second}$]

A look-up table using pre-computed 2-paths for $e_{first}$, $e_{second}$ is used for each e. This table is denoted detour[e]. The table detour[e] contains all the indices ($e_{first}$, $e_{second}$) that allow the jump from $v_{i,j}$ to $v_{m,n}$ via $v_{s,t}$.

The complexity of the algorithm discussed above is $O(Nr^4)$ as opposed to $O(N^3)$ for original MCL. This means that the algorithm is suitable for segmenting large images into superpixels.

Further, the algorithm discussed above to calculate $M^2$ can be efficiently mapped to a parallel architecture with one thread per pixel. The computation of the inflation operation can also be implemented with one thread per pixel. Thus, embodiments of the present invention allow the use of the MCL process as modified above to be implemented on a GPU.

In such an implementation, a speed up of 10 times has been observed in comparison to the original MCL method. Further, the modified method allows segmentation of large images for which the original MCL method was observed to run out of memory.

Figure 7:
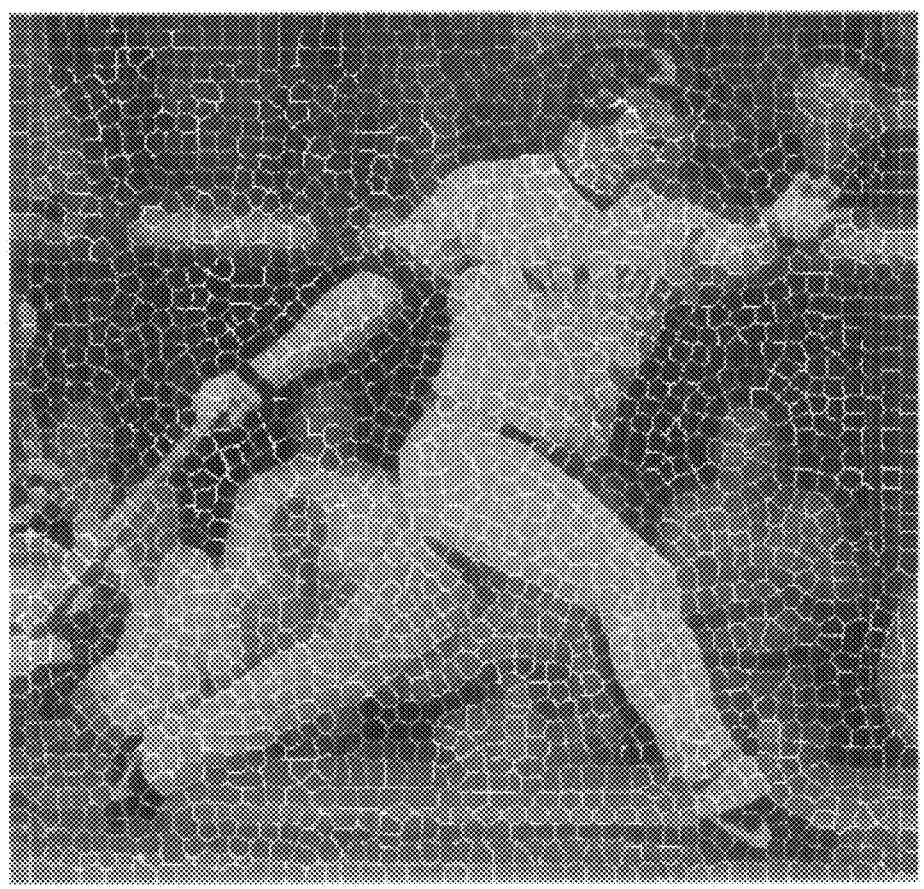
FIG. 7 is an image divided into superpixels.

FIG. 7 shows an image dividing into superpixels using the method described above. The image is 412 by 400 pixels. In this example, the inflation parameter p=1.4 and the distance threshold was taken as d=4.5. The algorithm was implemented using NVIDIA CUDA parallel processing architecture on a NVIDIA Quadro Fx 4600 GPU using single precision floating point (345 GFLOPs). The algorithm took 21.45 seconds to divide the image into superpixels as shown in FIG. 7. As can be seen from FIG. 7, the algorithm produces uniformly sized superpixels that are homogenous in shape.

Figure 8:
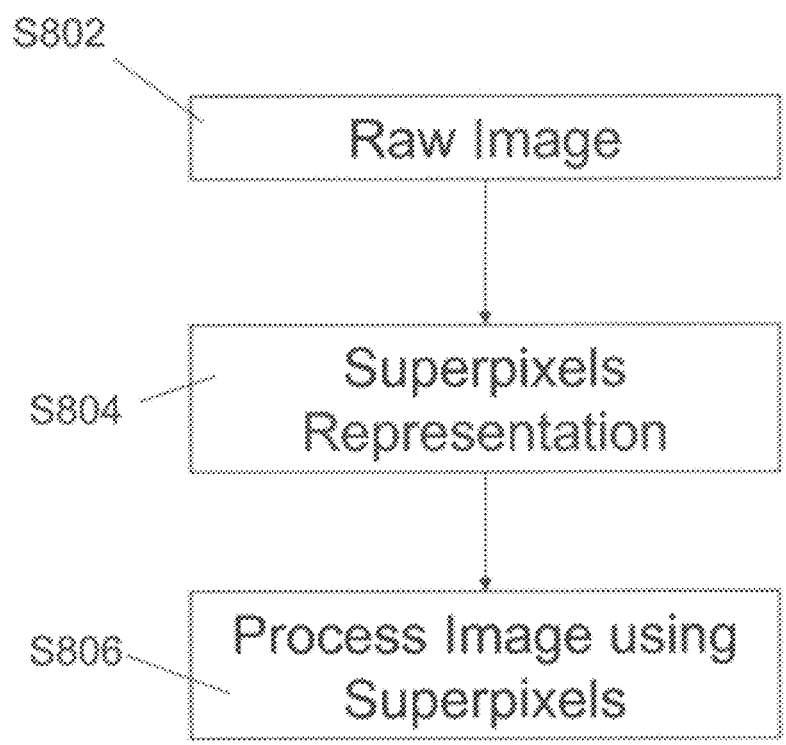
FIG. 8 is a flowchart showing a method of processing an image.

FIG. 8 shows a flowchart illustrating an image processing method that uses the methods described above for dividing an image into superpixels. In step S802 the raw image is received. In step S804, the image is divided into superpixels using the method described above. In S806, the image is processed using the superpixel representation derived in S804.

The processing of the image using the superpixels can be for example the detection of objects in the image. For example, based on the superpixels in the image human faces could be detected in the image. The processing of the image using the superpixels may be the classification of the image. The processing of the image may be a 3D reconstruction of the image. The processing of the image may be the compression or encoding of the image. For example, the image may be compressed or encrypted using an algorithm known to one of skill in the art.

Figure 9:
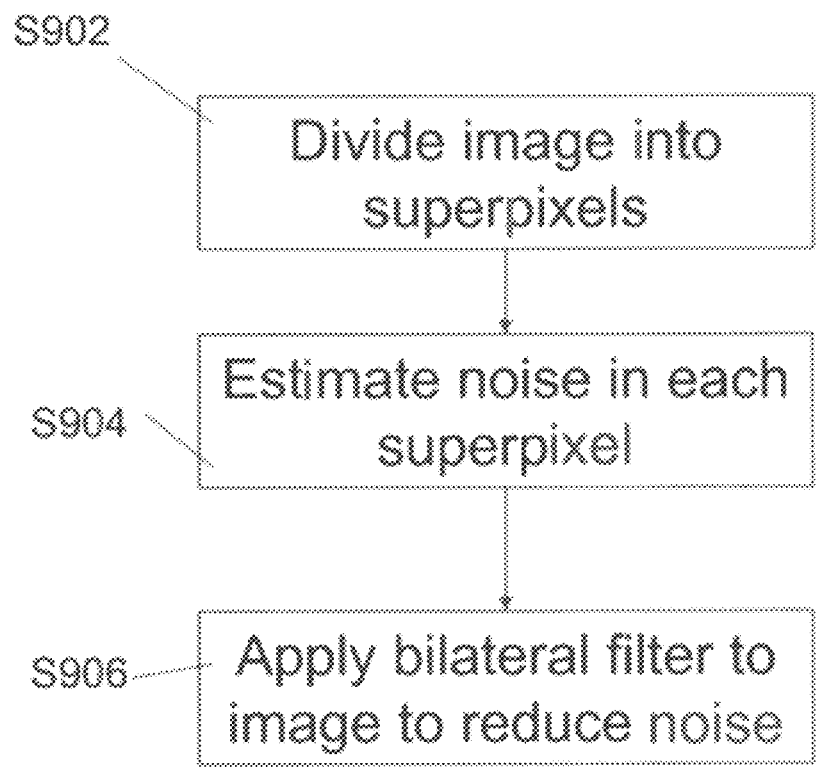
FIG. 9 is a flowchart illustrating a method of reducing noise in an image.

FIG. 9 shows a flowchart illustrating a method of reducing noise in an image. In step S902, the image is divided into superpixels using the method described above. In step S904, the noise in each superpixel is estimated by smoothing the intensity of the pixels in the superpixel and extracting the residual. The residual is taken as the noise. In step S906, a bilateral filter is applied to the image. The smoothing power of the bilateral filter is adapted to the estimated noise at each pixel. It is noted that when the image is divided into superpixels using the methods described above, homogeneous superpixels are produced. In the noise reduction method shown in FIG. 9, the use of homogeneous superpixels allows the noise to be estimated consistently over the whole image.

Figure 10:
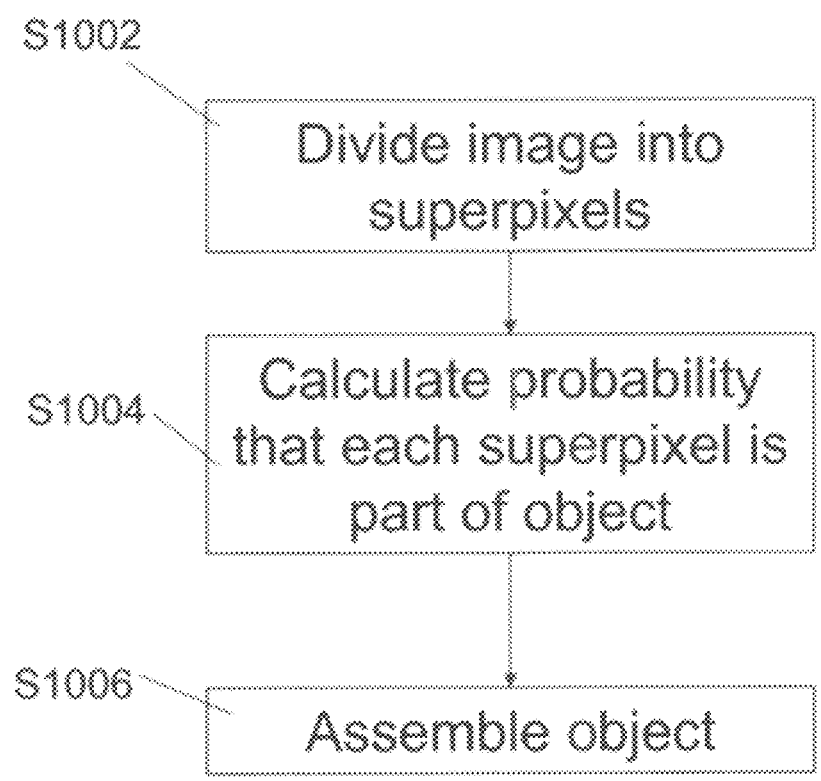
FIG. 10 is a flowchart illustrating a method of detecting an object in an image.

FIG. 10 shows a flowchart illustrating a method of detecting an object in an image. The method may be used to track an object over frames of a video sequence or to detect an object in a single image. In step S1002, the image is divided into superpixels using the method described above. In step S1004, the probability that each superpixel corresponds to a part of the object being detected is calculated. This is based on factors such as the separation of the superpixel from the background, shape cues, shading, and whether there is a difference in focus between a group of superpixels possibly representing parts of the object and a group representing the background. In step S1006, a representation of the object is selected from the candidate parts. The selection in step S1006 is made using the probabilities calculated in step S1004 and also constraints on the relative positions, relative sizes and symmetry of the object being detected.

The object detected using the method illustrated in FIG. 10 may be a person. In this example, in S1004, the probability the parts of the object are limbs or sections of limbs, the head or sections of the head and the torso or parts of the torso of a person. Once candidates for these parts are identified in the image, in step S1006, people can be detected in the image. Here, the relative positions are the positions of the arms and legs relative to the head and torso. The symmetry requirement is that there is symmetry in the clothing on the left and right arms for example.

Because the superpixels generated by the methods described in the present application are homogeneous, they can be considered as similar blocks and the assembly step S1006 is made more straightforward and accurate than in the case in which superpixels of varied shape and size are used.

Figure 11:
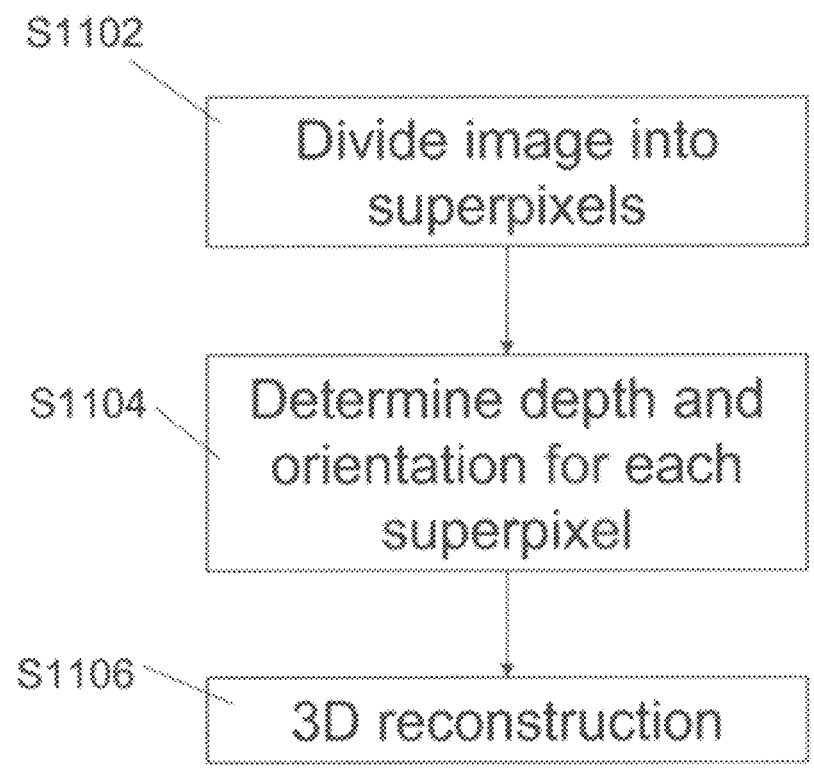
FIG. 11 is a flow chart illustrating a method of calculating a three dimensional reconstruction of an image.

FIG. 11 shows flow chart illustrating a method of calculating a three dimensional reconstruction of an image. In step S1102, the image is divided into superpixels using the methods described above. In the method it is assumed that each superpixel is planar. In step S1104, the depth and orientation of each superpixel is calculated. This is carried out by searching for the maximum posterior probability assignment of a Markov Random Field (MRF). This involves finding the depth and normal orientation for each superpixel that gives the minimum photoconsistency error when projecting it onto views of the scene while considering smooth changes of the depths and normals of neighbouring superpixels. In step S1106, a three dimensional reconstruction is calculated based on the depths and normal orientations. The three dimensional reconstruction may be based on more than one image. For example, the three dimensional reconstruction may be based up on a series of images taken from different positions.

When homogeneous superpixels are used in the method shown in FIG. 11, accurate results can be achieved at a low computational cost. It is known that non-homogeneity can degrade the performance of a MRF solver.

While certain embodiments have been described, these embodiments have been presented by way of example only, and are not intended to limit the scope of the inventions. Indeed, the novel methods and systems described herein may be embodied in a variety of other forms; furthermore, various omissions substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A method of dividing an image into a plurality of superpixels, each superpixel comprising a plurality of pixels of the image, the method comprising
    calculating, by a processor, an initial set of weights, each weight being associated with a pair of pixels of the image, using a measure of similarity between neighbouring pixels;
    calculating, by the processor, from the initial set of weights a resultant set of weights for pairs of pixels in the image separated by less than a threshold distance, wherein calculating the resultant set of weights comprises
        calculating, by the processor, a weight for a first pixel and a second pixel as the sum over third pixels of the product of the initial weight between the first pixel and a third pixel with the initial weight between that third pixel and the second pixel;
        calculating, by the processor, a value of each weight to a power coefficient;
    and normalising the set of weights to the power coefficient such that the set of all weights of a pixel sum to one;
    comparing, by the processor, the initial set of weights and the resultant set of weights to check for convergence to a converged set of weights; and
    grouping, by the processor, the pixels into superpixels using the converged set of weights.

2. A method according to claim 1, wherein calculating a weight for a first pixel and a second pixel comprises reading, by the processor, a first look up table, the first look up table indicating a set of transformations on the image from the first pixel to the set of pixels that are within the threshold distance of the first pixel.

3. A method according to claim 2, wherein calculating a weight for a first pixel and a second pixel further comprises reading, by the processor, a second look up table, the second look up table indicating the set transformations on the image from the first pixel to the second pixel via the set of third pixels.

4. A method according to claim 1, wherein the measure of similarity between pixels is calculated, by the processor, from a difference in intensity between pixels.

5. A method according to claim 1, further comprising allocating, by the processor, memory for storing a set of weights associated with each pixel of the image, the memory being allocated according to the number of pixels with the threshold distance of a given pixel.

6. A method according to claim 5, further comprising storing the initial set of weights in the memory as the set of weights associated with each pixel and replacing the initial set of weights with the resultant set of weights following calculation, by the processor, of the resultant set of weights.

7. A method of processing an image comprising
    dividing image into superpixels using a method according to claim 1; and
    processing the image, by the processor, using the superpixels.

8. A method according to claim 7, wherein processing the image using the superpixels comprise recognising, by the processor, a feature in the image.

9. A method according to claim 7, wherein processing the image using the superpixels comprises encoding the image, by the processor.

10. A method according to claim 7, wherein processing the image using the superpixels comprises calculating, by the processor, a three dimensional reconstruction of the image.

11. A method according to claim 7, wherein processing the image using the superpixels comprises reducing noise in the image, by the processor.

12. A non-transitory computer readable medium carrying computer executable instructions which when executed on a computer cause the computer to execute the method according to claim 1.

13. An image processing system for dividing image into a plurality of superpixels, each superpixel comprising a plurality of pixels of the image, the system comprising:
    a processor operable to
        calculate an initial set of weights, each weight being associated with a pair of pixels of the image, using a measure of similarity between neighbouring pixels;
        calculate from the initial set of weights a resultant set of weights for pairs of pixels in the image separated by less than a threshold distance, by calculating a weight for a first pixel and a second pixel as the sum over third pixels of the product of the initial weight between the first pixel and a third pixel with the initial weight between that third pixel and the second pixel;
        calculating a value of each weight to a power coefficient; and normalising the set of weights to the power coefficient such that the set of all weights of a pixel sum to one;
        compare the initial set of weights and the resultant set of weights to check for convergence to a converged set of weights; and group the pixels into superpixels using the converged set of weights.

14. A system according to claim 13, further comprising storage for a first look up table, the first look up table indicating a set of transformations on the image from the first pixel to the set of pixels that are within the threshold distance of the first pixel, the processor being operable to calculate a weight for a first pixel and a second pixel by reading a first look up table.

15. A system according to claim 14, further comprising storage for a second look up table, the second look up table indicating the set transformations on the image from the first pixel to the second pixel via the set of third pixels, the processor being operable to calculate a weight for a first pixel and a second pixel by reading the second look up table.

16. A system according to claim 13, further comprising a memory, the memory being allocated for storing a set of weights associated with each pixel of the image being allocated according to the number of pixels with the threshold distance of a given pixel.

17. A system according to claim 16, the processor being further operable to store the initial set of weights in the memory as the set of weights associated with each pixel and replace the initial set of weights with the resultant set of weights following calculation of the resultant set of weights.

18. A system according to claim 13, the processor being further operable to reduce noise in the image using the superpixels.

19. A system according to claim 13, wherein the processor is operable to recognise a feature in the image using the superpixels.

20. A system according to claim 13, wherein the processor is operable to calculate a three dimensional representation of the image using the superpixels.

* * * * *